(12) United States Patent
Lorenz

(10) Patent No.: US 11,820,502 B2
(45) Date of Patent: Nov. 21, 2023

(54) WING FOR AN AIRCRAFT

(71) Applicant: Airbus Operations GmbH, Hamburg (DE)

(72) Inventor: Christian Lorenz, Weyhe (DE)

(73) Assignee: AIRBUS OPERATIONS GmbH, Hamburg (DE)

( * ) Notice: Subject to any disclaimer, the term of this patent is extended or adjusted under 35 U.S.C. 154(b) by 1251 days.

(21) Appl. No.: 16/389,156

(22) Filed: Apr. 19, 2019

(65) Prior Publication Data

US 2019/0322351 A1 Oct. 24, 2019

(30) Foreign Application Priority Data

Apr. 24, 2018 (DE) ..................... 10 2018 109 872.3

(51) Int. Cl.
| | |
|---|---|
| B64C 3/56 | (2006.01) |
| F16D 63/00 | (2006.01) |
| F16D 55/36 | (2006.01) |
| F16D 55/38 | (2006.01) |
| F16D 121/06 | (2012.01) |
| F16D 121/18 | (2012.01) |
| F16D 121/04 | (2012.01) |

(52) U.S. Cl.
CPC ................ B64C 3/56 (2013.01); F16D 55/36 (2013.01); F16D 55/38 (2013.01); F16D 63/00 (2013.01); F16D 63/002 (2013.01); F16D 2121/04 (2013.01); F16D 2121/06 (2013.01); F16D 2121/18 (2013.01)

(58) Field of Classification Search
CPC ....................................................... B64C 3/56
See application file for complete search history.

(56) References Cited

U.S. PATENT DOCUMENTS

| | | | | |
|---|---|---|---|---|
| 5,310,138 A | * | 5/1994 | Fitzgibbon | ................ B64C 3/56 244/49 |
| 2011/0185998 A1 | * | 8/2011 | Murphy | .................... F01C 9/00 123/18 A |
| 2015/0097087 A1 | * | 4/2015 | Sakurai | ..................... B64C 9/00 244/201 |
| 2016/0167092 A1 | * | 6/2016 | Gaw | ......................... B08B 6/00 15/1.51 |

(Continued)

FOREIGN PATENT DOCUMENTS

| | | | | |
|---|---|---|---|---|
| CA | | 2882481 A1 * | 11/2015 | ............... B64C 3/56 |
| DE | 10 2016 002 468 | | 8/2017 | |

(Continued)

OTHER PUBLICATIONS

Search Report for DE102018109872.3 dated Dec. 18, 2018, 9 pages.

(Continued)

Primary Examiner — Melody M Burch
(74) Attorney, Agent, or Firm — Nixon & Vanderhye P.C.

(57) ABSTRACT

A wing for an aircraft is disclosed having a fixed wing, a foldable wing tip portion mounted to the fixed wing via a hinge rotatable about a hinge axis between an extended position and a folded position, and an actuation unit for actuating the foldable wing tip portion for movement about the hinge axis. The wing includes a brake unit for securing the foldable wing tip portion in the folded position, and the brake unit is formed separately from the actuation unit.

18 Claims, 2 Drawing Sheets

(56) References Cited

U.S. PATENT DOCUMENTS

2017/0174314 A1* 6/2017 Diamante ................. B64C 3/56

FOREIGN PATENT DOCUMENTS

| EP | 3121115 A1 | * | 1/2017 | ............. B64C 13/40 |
|----|------------|---|--------|--------------------------|
| GB | 2530578 A | * | 3/2016 | ............... B64C 3/56 |
| GB | 2539497 A | * | 12/2016 | ........... B64C 23/072 |
| WO | WO-2017080665 A1 | * | 5/2017 | ............... B64C 3/42 |

OTHER PUBLICATIONS

Translation Certificate and English Translation of German Search Report issued in DE 10 2018 109 872.3, dated Dec. 18, 2018, 10 pages.

* cited by examiner

WING FOR AN AIRCRAFT

CROSS REFERENCE TO RELATED APPLICATION

This application claims priority to and incorporates by reference German Application Number DE 10 2018 109 872.3, filed Apr. 24, 2018.

BACKGROUND

1. Field of the Invention

The present disclosure relates to a wing for an aircraft, in particular to a foldable wing including a fixed wing and a foldable wing tip portion. A further aspect of the disclosure relates to an aircraft comprising such a wing.

2. Description of Related Art

Such a wing comprises a fixed wing for being mounted to a fuselage, and a foldable wing tip portion mounted to the fixed wing via a hinge or hinges rotatable about a hinge axis between an extended position, where the foldable wing tip portion extends as a continuous extension of the fixed wing preferably in a common plane with the fixed wing, and a folded position, where the foldable wing tip portion extends upwards or rearwards in order to reduce the overall span of the aircraft compared to the extended position. Specifically, when the foldable wing tip portion is foldable upwards, the hinge axis extends in a horizontal plane and/or in parallel to a chord line and/or in parallel to the wing surface and/or in a flight direction of the aircraft. Alternatively, when the foldable wing tip portion is foldable rearwards, the hinge axis extends in a vertical direction and/or in a wing depth direction and/or in a direction transverse or perpendicular to the wing surface.

Further, the wing comprises an actuation unit for actuating the foldable wing tip portion for movement about the hinge axis relative to the fixed wing, i.e. for movement between the extended and the folded positions. The actuation unit might be formed in various ways, e.g. as a rack and pinion drive, and might be mounted between the fixed wing and the foldable wing tip portion near the hinge axis.

Foldable wings are developed in order to reduce the space requirements of an aircraft during maneuver and parking on ground. As soon as the aircraft has landed the foldable wing tip portions of the wings are folded upwards or rearwards, thereby reducing the overall span of the aircraft.

In the extended position the foldable wing tip portion is usually secured by an individual arresting device. However, in the folded position, when the aircraft is on the ground, the foldable wing tip portion is usually held only by the actuation unit. This means the actuation unit needs to be designed not only to move but also to hold the foldable wing tip portion in place.

SUMMARY

A wing having an actuation unit with reduced complexity is disclosed herein.

The wing comprises a brake unit for securing the foldable wing tip portion in the folded position, wherein the brake unit is formed separately and independently from the actuation unit. This means, the brake unit can be actuated individually and separately from the actuation unit. In such a way, the actuation unit does not need to hold the foldable wing tip portion in the folded position and therefore can be designed with reduced complexity. Further, a failure of the actuation unit does not lead to the foldable wing tip portion moving out of the folded position.

According to an embodiment, the brake unit comprises a first brake part fixedly mounted to the fixed wing, and a second brake part fixedly mounted to the foldable wing tip portion. The first and second brake parts may be arranged such that they rotate relative to one another about a brake axis when the foldable wing tip portion rotates about the hinge axis. The first and second brake parts may be configured such that they can be engaged at least when the foldable wing tip portion is in the folded position. However, the first and second brake parts might also be engaged in intermediate position, such that securing of the foldable wing tip portion is possible also in positions between the folded and extended positions. Further, the brake parts might have engagement surfaces extending transverse or in parallel to the brake axis, so that they can be moved into engagement along the brake axis or transverse to the brake axis. By such brake parts a simple, flexible and efficient brake can be formed.

According to another embodiment, a control unit is provided to control engagement and disengagement of the first and second brake parts. The control unit might be part of an overall foldable wing system control unit, or might be a separate control unit connected to the overall foldable wing system control unit. The control unit might also be coupled to brake actuators for actuating engagement and/or disengagement of the brake parts. Such brake actuators might be electric or hydraulic actuators.

According to yet another embodiment, the first and second brake parts are arranged such that the brake axis coincides with the hinge axis. In such a way, no additional linkage is required to connect the brake parts to the fixed wing and to the foldable wing tip portion, respectively, so that a particularly simple and efficient brake unit is formed.

According to an alternative embodiment, the first and second brake parts are arranged such that the brake axis is parallelly spaced apart from the hinge axis. The first brake part is mounted to the fixed wing via a linkage. Alternatively or additionally, the second brake part is mounted to the foldable wing tip portion via a linkage. Such a linkage might include one or more pivotal links.

In a further embodiment, a stopper is provided to restrict any movement of the foldable wing tip portion beyond the folded position. In such a way, in the folded position the foldable wing tip portion is secured to one direction, specifically to the upward direction, by the stopper and to the opposite direction, specifically to the downward direction, by the brake unit.

In yet a further embodiment, the brake unit is formed as an active brake where engagement and disengagement of the brake parts are driven by electric or hydraulic power, for example, by electric or hydraulic brake actuators moving the brake parts in and out of engagement. Such an active brake allows to be controlled very precisely.

In particular, the brake unit may be formed as a multiple disk brake where the first and second brake parts are formed as disks that engage one another with their main surfaces by movement along the brake axis. Such a multiple disk brake represents a very simple and efficient brake unit.

In an alternative embodiment, the brake unit is formed as a power-off brake where the first and second brake parts are engaged in an unpowered way, i.e. without requiring external power, and where the first and second brake parts are disengaged driven by electric or hydraulic power, for example, by an electric or hydraulic brake actuator. As power is required only for disengaging the brake parts, the power-off brake relates to a very simple and low maintenance brake unit.

In particular, the brake unit may be formed as a ratchet brake that allows relative movement of the first and second brake parts in the direction to the folded position, and that restricts relative movement of the first and second brake parts in the opposite direction from the folded position back to the extended position of the foldable wing tip portion. Such a ratchet brake represents a very simple, reliable and efficient power-off brake.

Alternatively, the brake unit may be formed as a freewheel brake that allows relative movement of the first and second brake parts in the direction to the folded position, and that restricts relative movement of the first and second brake parts in the opposite direction from the folded position back to the extended position of the foldable wing tip portion. Such a freewheel brake represents a very simple, reliable and efficient power-off brake.

Alternatively, the brake unit may be formed as a power-off disk brake that has disk-shaped first and second brake parts configured for engagement along their main surfaces, and that allows relative movement of the first and second brake parts in the direction to the folded position, while restricting relative movement of the first and second brake parts in the opposite direction from the folded position back to the extended position of the foldable wing tip portion. Such a power-off disk brake represents a very simple, reliable and efficient power-off brake.

A further aspect of the present disclosure relates to an aircraft comprising a wing according to any of the embodiment described above. The features and effects described above in connection with the wing apply vis-à-vis to the aircraft.

BRIEF DESCRIPTION OF THE DRAWINGS

For an understanding of embodiments of the disclosure, reference is now made to the following description taken in conjunction with the accompanying drawings, in which.

DETAILED DESCRIPTION OF SOME EMBODIMENTS

Some embodiments will now be described with reference to the Figures.

Figure 1:
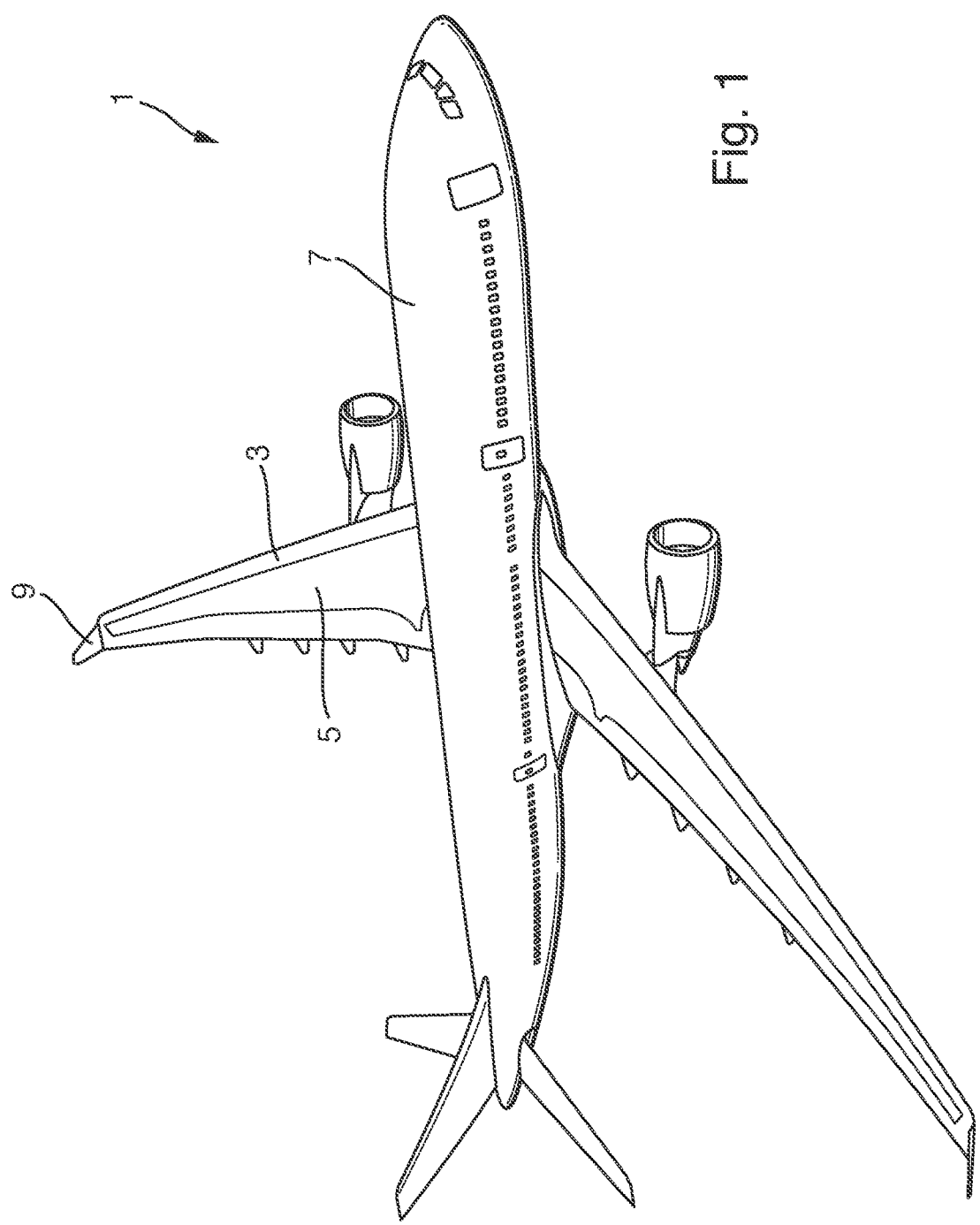
FIG. 1 a perspective view of an aircraft according to an exemplary embodiment.

FIG. 1 shows an exemplary aircraft 1 according to an embodiment. The aircraft 1 comprises a foldable wing 3 including a fixed wing 5 mounted to a fuselage 7, and a foldable wing tip portion 9 movably mounted to the fixed wing 5.

Figure 2:
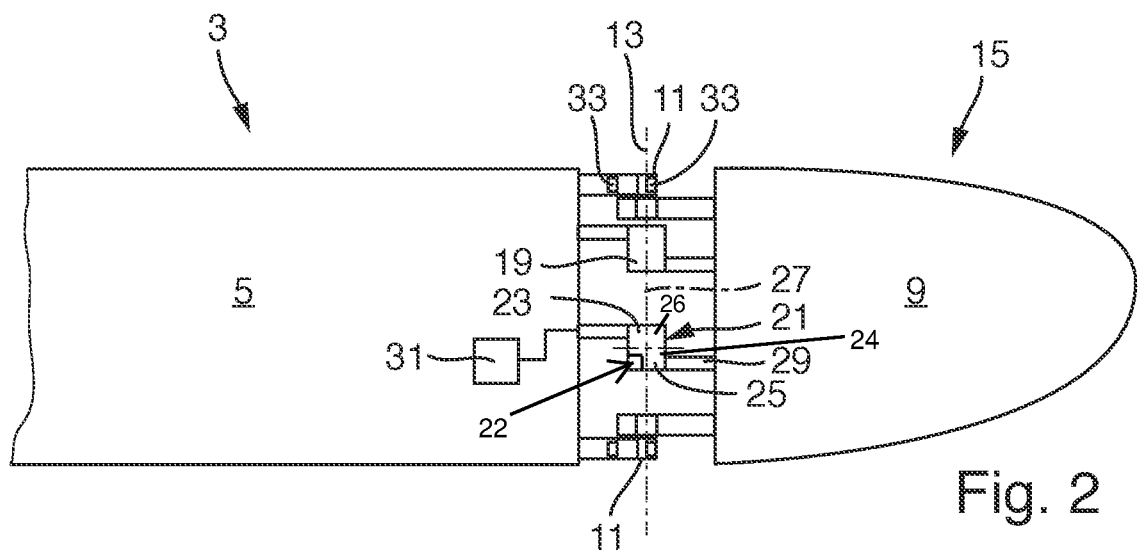
FIG. 2 a schematic top view of an embodiment of the wing according to an exemplary embodiment.
Figure 3:
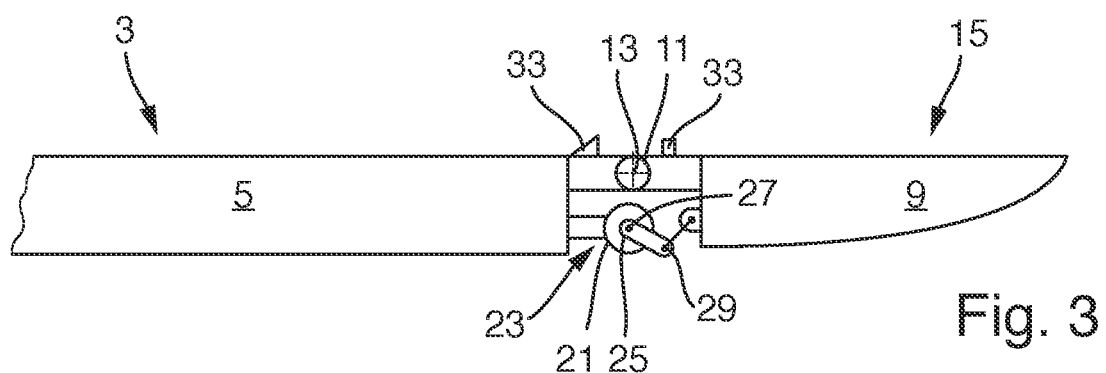
FIG. 3 a side view of the wing shown in FIG. 2 with the foldable wing tip portion in the extended position; and, FIG. 4 a side view of the wing shown in FIG. 2 with the foldable wing tip portion in the folded position.
Figure 4:
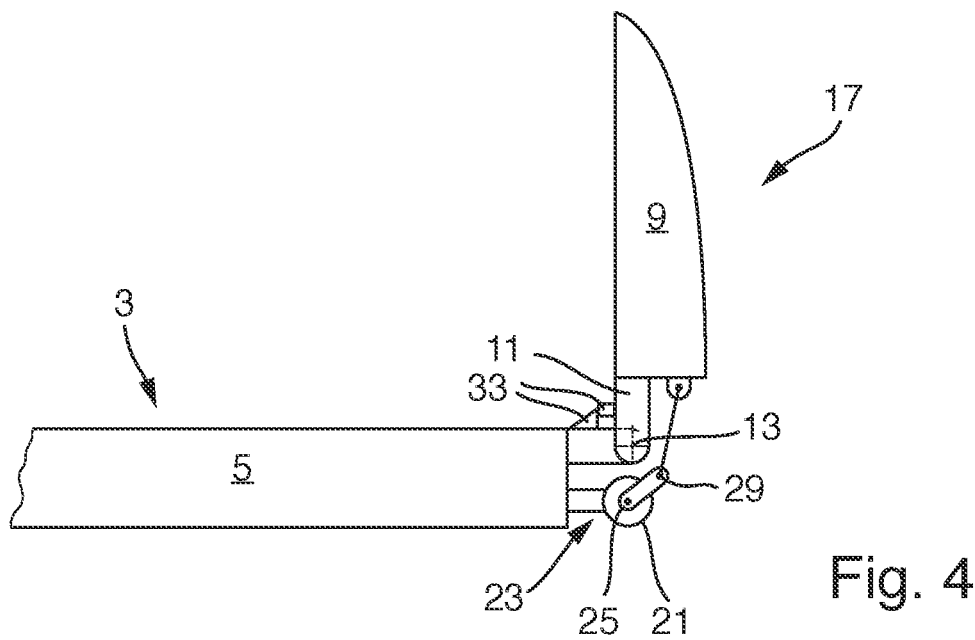

FIGS. 2 to 4 illustrate the wing 3 of the aircraft 1 shown in FIG. 1 in further detail. The foldable wing tip portion 9 is mounted to the fixed wing 5 via hinges 11 rotatable about a hinge axis 13 between an extended position 15 (see FIGS. 2 and 3) and a folded position 17 (see FIG. 4). In the extended position 15 the foldable wing tip portion 9 extends as a continuous extension of the fixed wing 5 in a common plane with the fixed wing 5, wherein in the folded position 17 the foldable wing tip portion 9 extends upwards in order to reduce the overall span of the aircraft 1. The hinge axis 13 extends in parallel to a chord line and in a flight direction of the aircraft 1. Further, the wing 3 comprises an actuation unit 19 for moving the foldable wing tip portion 9 about the hinge axis 13 relative to the fixed wing 5.

The wing 3 comprises a brake unit 21 for securing the foldable wing tip portion 9 in the folded position 17. The brake unit 21 is formed separately and independently from the actuation unit 19, so that the brake unit 21 can be actuated individually and separately from the actuation unit 19.

The brake unit 21 comprises a first brake part 23 fixedly mounted to the fixed wing 5, and a second brake part 25 fixedly mounted to the foldable wing tip portion 9. The first and second brake parts 23, 25 are arranged such that they rotate relative to one another about a brake axis 27 when the foldable wing tip portion 9 rotates about the hinge axis 13. The first and second brake parts 23, 25 are configured such that they can be engaged when the foldable wing tip portion 9 is in the folded position 17.

In the present embodiment, the first and second brake parts 23, 25 are arranged such that the brake axis 27 is parallelly spaced apart from the hinge axis 13, while the second brake part 25 is mounted to the foldable wing tip portion 9 via a linkage 29. However, in other embodiments the first and second brake parts 23, 25 might be arranged such that the brake axis 27 coincides with the hinge axis 13.

In the present embodiment, the brake unit 21 is formed as an active brake where engagement and disengagement of the brake parts 23, 25 are driven by electric or hydraulic power, for example, by an electric or hydraulic brake actuator 22. More specifically, the brake unit 21 is formed as a multiple disk brake where the first and second brake parts 23, 25 are formed as disks that engage one another with their main surfaces by movement along the brake axis 27. However, in other embodiments the brake unit 21 might also be formed as a power-off brake, such as a ratchet brake 24 or a freewheel brake 26.

Further, the wing 3 comprises a control unit 31 for controlling engagement and disengagement of the first and second brake parts 23, 25. The wing 3 also comprises a stopper 33 to restrict movement of the foldable wing tip portion 9 beyond the folded position 17, so that in the folded position 17 the foldable wing tip portion 9 is secured to one direction by the stopper 33 and to the opposite direction by the brake unit 21.

While at least one exemplary embodiment is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment (s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A wing for an aircraft, comprising:
    a fixed wing, a foldable wing tip portion mounted to the fixed wing via a hinge rotatable about a hinge axis between an extended position and a folded position, and an actuation unit for actuating the foldable wing tip portion for movement about the hinge axis, wherein the wing comprises a brake unit having at least a first disk brake part and a second disk brake part configured to engage one another with main surfaces by movement along a brake axis, wherein the brake unit is configured to secure the foldable wing tip portion in the folded position, wherein the engagement or disengagement of the first and second disk brake parts are driven by electric or hydraulic power, the brake unit is formed separately from the actuation unit, and wherein the first and second disk brake parts are arranged such that the brake axis coincides with the hinge axis.

2. The wing according to claim 1, wherein the first disk brake part is mounted to the fixed wing, and the second disk brake part is mounted to the foldable wing tip portion, wherein the first and second disk brake parts are arranged such that they rotate relative to one another about the brake axis when the foldable wing tip portion rotates about the hinge axis, and wherein the first and second disk brake parts are configured such that they can be engaged when the foldable wing tip portion is in the folded position.

3. The wing according to claim 2, further comprising a control unit to control engagement and disengagement of the first and second disk brake parts.

4. The wing according to claim 2, wherein the first brake part is mounted to the fixed wing via a linkage, and/or the second brake part is mounted to the foldable wing tip portion via a linkage.

5. The wing according to claim 1, further comprising a stopper to restrict movement of the foldable wing tip portion beyond the folded position, so that in the folded position the foldable wing tip portion is secured to one direction by the stopper and to the opposite direction by the brake unit.

6. The wing according to claim 5, wherein the brake unit is formed as a power-off disk brake where the first and second disk brake parts are engaged in an unpowered way and where the first and second disk brake parts are disengaged driven by electric or hydraulic power.

7. The wing according to claim 6, wherein the brake unit is formed as a ratchet brake that allows relative movement of the first and second disk brake parts in the direction to the folded position, and that restricts relative movement of the first and second disk brake parts in the opposite direction to the extended position of the foldable wing tip portion.

8. The wing according to claim 6, wherein the brake unit is formed as a freewheel brake that allows relative movement of the first and second disk brake parts in the direction to the folded position, and that restricts relative movement of the first and second disk brake parts in the opposite direction to the extended position of the foldable wing tip portion.

9. The wing according to claim 6, wherein the power-off disk brake allows relative movement of the first and second disk brake parts in the direction to the folded position, while restricting relative movement of the first and second disk brake parts in the opposite direction from the folded position back to the extended position of the foldable wing tip portion.

10. An aircraft, comprising:
a wing, the wing comprising
a fixed wing,
a foldable wing tip portion mounted to the fixed wing via a hinge rotatable about a hinge axis between an extended position and a folded position, and
an actuation unit for actuating the foldable wing tip portion for movement about the hinge axis,
wherein the wing comprises a brake unit having at least a first disk brake part and a second disk brake part configured to engage one another with main surfaces by movement along a brake axis, wherein the brake unit is configured to secure the foldable wing tip portion in the folded position,
wherein the engagement and disengagement of the first and second disk brake parts are driven by electric or hydraulic power,
the brake unit is formed separately from the actuation unit, and
wherein the first and second disk brake parts are arranged such that the brake axis is parallelly spaced apart from the hinge axis.

11. An aircraft wing, comprising:
a fixed wing,
a wing tip portion,
a hinge having a hinge axis,
wherein the wing tip portion is rotatably mounted to the fixed wing via the hinge axis,
an actuator for rotating and folding the wing tip portion between an extended position and a folded position along the hinge axis,
a brake unit having a first brake disk part attached to the fixed wing and a second brake disk part attached to the wing tip portion,
wherein the first and the second disk brake parts are configured to engage one another with main surfaces by movement along a brake axis, wherein the brake is configured to secure the foldable wing tip portion in the folded position,
a controller to hold and release the first and second disk brake parts from one another when the wing tip portion is in the folded position, and
wherein the first and second parts disk brake are arranged such that the brake axis is parallelly spaced apart from the hinge axis.

12. The aircraft according to claim 10, further comprising a stopper to restrict movement of the foldable wing tip portion beyond the folded position, so that in the folded position the foldable wing tip portion is secured to one direction by the stopper and to the opposite direction by the brake unit.

13. The aircraft according to claim 12, wherein the brake unit is formed as a freewheel brake that allows relative movement of the first and second disk brake parts in the direction to the folded position, and that restricts relative movement of the first and second disk brake parts in the opposite direction to the extended position of the foldable wing tip portion.

14. The aircraft according to claim 12, wherein the brake unit is formed as a power-off disk brake that allows relative movement of the first and second disk brake parts in the direction to the folded position, while restricting relative movement of the first and second disk brake parts in the opposite direction from the folded position back to the extended position of the foldable wing tip portion.

15. The aircraft wing according to claim 11, further comprising a stopper to restrict movement of the foldable wing tip portion beyond the folded position, so that in the folded position the foldable wing tip portion is secured to one direction by the stopper and to the opposite direction by the brake unit.

16. The aircraft wing according to claim 15, wherein the brake unit is formed as a power-off brake where the first and second disk brake parts are engaged in an unpowered way and where the first and second disk brake parts are disengaged driven by electric or hydraulic power.

17. The aircraft wing according to claim 15, wherein the brake unit is formed as a freewheel brake that allows relative movement of the first and second disk brake parts in the direction to the folded position, and that restricts relative movement of the first and second disk brake parts in the opposite direction to the extended position of the foldable wing tip portion.

18. The aircraft wing according to claim 15, wherein the brake unit is formed as a power-off disk brake that allows relative movement the first and second disk brake parts in the direction to the folded position, while restricting relative movement of the first and second disk brake parts in the opposite direction from the folded position back to the extended position of the foldable wing tip portion.

\* \* \* \* \*